D. E. BARTON, DEC'D.
J. H. SPENCE, ADMINISTRATOR.
SLEET CUTTING TROLLEY.
APPLICATION FILED OCT. 4, 1909.
1,038,508.
Patented Sept. 10, 1912.
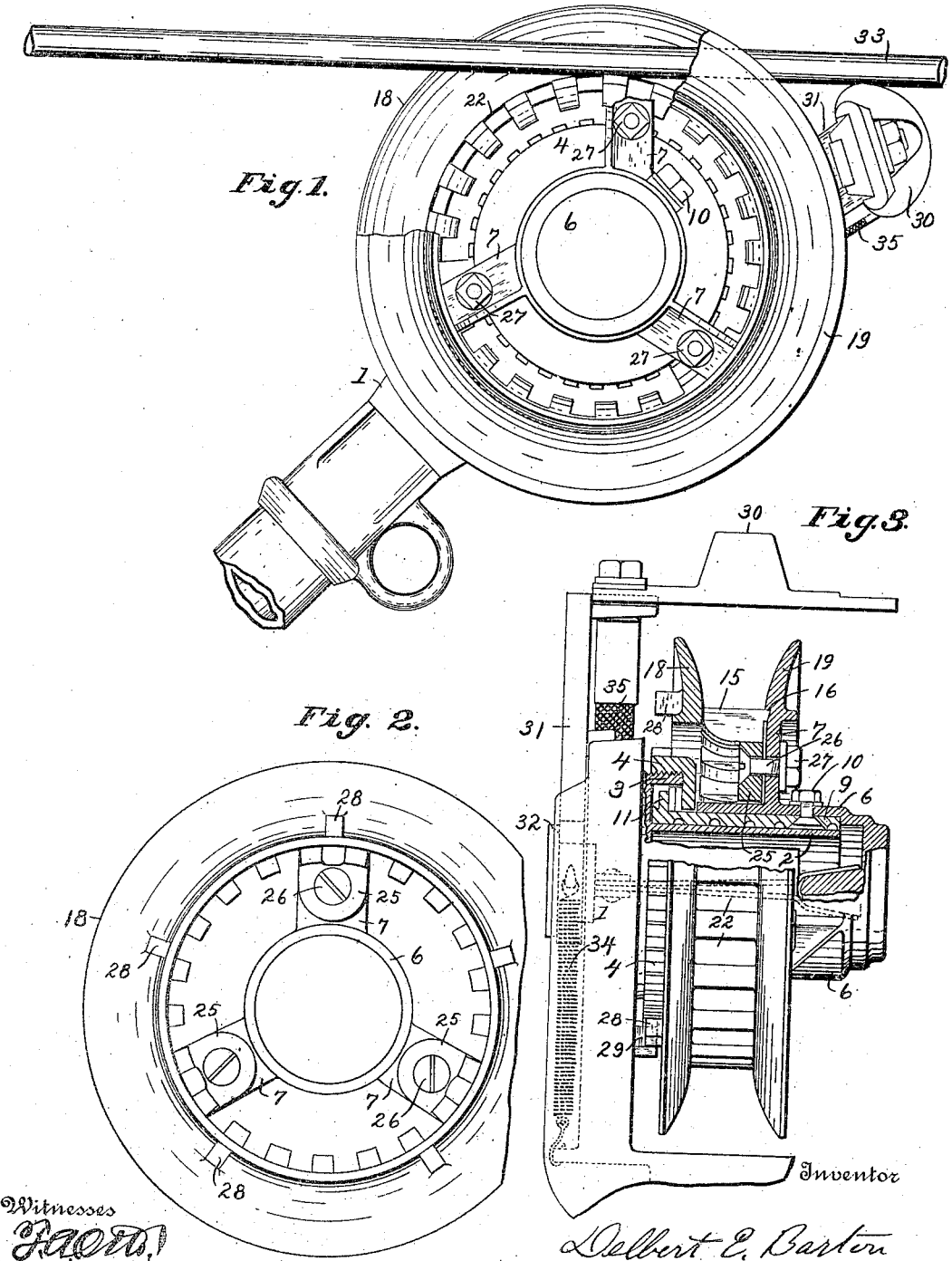

UNITED STATES PATENT OFFICE.

DELBERT E. BARTON, OF MILWAUKEE, WISCONSIN; JAMES H. SPENCE ADMINISTRATOR OF SAID DELBERT E. BARTON, DECEASED.

SLEET-CUTTING TROLLEY.

1,038,508.  Specification of Letters Patent.  Patented Sept. 10, 1912.

Application filed October 4, 1909. Serial No. 520,973.

*To all whom it may concern:*

Be it known that I, DELBERT E. BARTON, a citizen of the United States, residing at Milwaukee, county of Milwaukee, and State of Wisconsin, have invented new and useful Improvements in Sleet-Cutting Trolleys, of which the following is a specification.

My invention relates to improvements in sleet cutting trolleys.

The object of my invention is to provide a device which can be readily removed from and replaced on a supporting harp in substitution for a trolley wheel, such removal and replacement being possible without delaying the car, and the construction being such that a substitution can be made by even an inexperienced conductor or motorman without danger of improper adjustments.

A further object of my invention is to provide a form of sleet cutter which may be readjusted from time to time to bring new cutting faces into operation whenever the cutters, then in use, fail to operate effectively. Also to provide means whereby the cutters may be removed bodily from the trolley and a new set of cutters substituted, thus restoring such a trolley to its original condition of effectiveness after all of the cutting surfaces of the original cutters have been worn away.

In the following description reference is had to the accompanying drawings in which, Figure 1 is a side view of a portion of a trolley pole showing my improved sleet cutting shoe in position of use, with one of the side rings partially broken away and showing the cutters in cross section. Fig. 2 is a side view of the main trolley shoe showing the same from the side opposite that exhibited in Fig. 1. Fig. 3 is a front view of the shoe, part in section.

Like parts are identified by the same reference characters throughout the several views.

In a former application filed September 16th, 1909, Serial Number 517,986, I have shown and described a harp member and trolley in which a trolley wheel having a cup shaped hub is adjusted to a tubular spindle projecting laterally from a single armed harp, the trolley wheel hub being provided with a flanged bushing adapted to be engaged by a reversely flanged nut connected with the harp member and which may be unscrewed to release the trolley wheel from the harp.

In the drawings of this application I have illustrated my improved sleet cutter in such a structural form that it may be substituted for the trolley wheel shown and described in my former application. In this application, therefore, I have illustrated a harp member 1, provided with a laterally projecting spindle 2, and having a threaded annulus 3, adapted to receive a flanged nut 4, whereby either a trolley wheel or my improved sleet cutter may be secured in position on said spindle, the harp member, spindle and flanged nut being substantially the same as shown and described in my former application.

My improved sleet cutting shoe has the general form of a trolley wheel and is provided with a cup shaped hub 6, having outwardly extending arms 7, supporting a rim flange 19 which corresponds in position to one of the rim flanges of a trolley wheel. A bushing 9 extends into the hub 6 and is secured thereto by a bolt 10. The inner end of this bushing, which projects toward the harp from the hub 6, is provided with a flange 11, adapted to be engaged by the retaining flanged nut 4, whereby the sleet cutting shoe is secured to the harp. A ring 15 has one side margin fitted to an annular recess 16 in the flange 19, and the other side margin of this ring is provided with an outwardly extending rim flange 18. The flanges 18 and 19 have divergently curved outer margins, which are similar in form to the peripheral or rim flanges of an ordinary trolley wheel. Between the flanges 18 and 19, the ring 15 is provided with an annular series of transverse slots 22, whereby the ice or sleet is permitted to pass freely through the ring and to discharge from within the ring at either side. These slots have their side walls substantially in radial lines whereby, as the ring is worn away, the edges of the slot walls are kept sharp. The ring 15 is provided with inwardly extending ears 25 which are secured to the arms 7 by bolts 26 and nuts 27, thus holding the ring in position. This ring 15 (or the flanged portion 18 thereof) is provided with a series of lugs 28, projecting in the direction of the harp sufficiently to engage the harp at 29 and prevent the shoe from rotating in the same manner as a trolley wheel. There are a sufficient number of these projections 28, however, so that by unscrewing the flanged nut 4, the shoe may be partially rotated at any time to bring another portion of the ring 15 into contact with the conducting wire. When the ring 15 has been worn on all sides so as to become unserviceable, the bolts 26 may be removed and a new ring substituted, the hub with the arms 7 and hub bushing being ordinarily retained, since these parts are substantially indestructible.

An auxiliary shoe 30 is preferably supported in the rear of the sleet cutter by an arm 31 which is pivotally secured at 32 to the harp and is held in a raised position by a spring 34, whereby the shoe 30 is maintained in contact with the conducting wire 33. A flexible conductor 35 is preferably employed to electrically connect the shoe 30 with the harp. This shoe 30 will be found an effective auxiliary to the sleet cutter, for in case the contact of the sleet cutter with the wire should at any time be broken by interposed sleet or by jolting, the shoe 30 will convey the current to the harp and prevent arcing. As this shoe travels back of the sleet cutter, the sleet will ordinarily have been removed from the wire to such an extent that both the shoe 30 and the sleet cutter shoe will seldom, if ever, be out of contact with the wire at the same time.

It is not material to the present invention whether the auxiliary shoe 30 is rotatable or not. Neither is it material whether the sleet cutting shoe is applied to the specific form of harp shown and described or not, since it is obvious that with slight modifications a shoe embodying my invention may be applied to any form of harp.

Having thus described my invention, what I claim as new, and desire to secure by Letters Patent is,—

1. A sleet cutting trolley, comprising a supporting harp, a hub removably secured thereto, and provided with radially extending arms, a rim flange connected with said arms, a ring having one margin removably secured to one face of said flange and having a radially extending flange on its other margin, said flanges and ring being arranged to form a pulley shaped and rotatably adjustable shoe and projections on one of said flanges adapted respectively to engage the harp and prevent the shoe from rotating when the latter is in different positions of adjustment, said ring having a series of transverse slots, the side walls of which are substantially in planes radial to the hub axis.

2. A sleet cutting trolley, comprising a harp, a spindle thereon, a circular sleet cutting shoe having a peripheral ring provided with transverse slots, and having outwardly extending flanges at its respective side margins, a hub connected with one side of said shoe and adapted to be removably connected with said spindle, and means for holding said shoe against rotation in various positions of rotatable adjustment on said spindle.

3. A sleet cutting trolley, comprising a harp, a spindle thereon, a circular sleet cutting shoe having a peripheral ring provided with transverse slots, and having outwardly extending flanges at its respective side margins, a hub connected with one side of said shoe and adapted to be removably connected with said spindle, and means for holding said shoe against rotation in various positions of rotatable adjustment on said spindle, together with an auxiliary shoe, and a spring supported arm connected with said harp and adapted to hold the auxiliary shoe in contact with a conducting wire in the rear of the sleet cutting shoe.

4. A sleet cutting trolley shoe, comprising a circular device having a rim portion conforming in general outline to that of a trolley wheel, and provided with slots in its bearing surfaces extending in planes radial to the axis of said shoe, a hub, supporting arms connecting the hub with said rim portion at one side, and arranged with the space between the hub and rim substantially open on both sides to the exterior; said shoe being adapted to be substituted for a trolley wheel upon a supporting spindle; and projections on said shoe adapted to engage a spindle supporting member and hold said shoe against rotation in various positions of rotatable adjustment on the spindle.

5. In a sleet cutting trolley shoe, the combination of a hub, a circular flange supported therefrom, a ring having one side margin in interlocking engagement with said flange between the hub and the outer margin of the flange,—said ring being provided with transverse slots,—and an outwardly extending circular flange on the other side margin of said ring, the outer margins of said circular flanges being curved laterally and divergently in the form of trolley wheel rim flanges, and means for holding said shoe against rotation in various positions of adjustment.

6. In a sleet cutting trolley shoe, the combination of a hub, a ring provided with transverse slots and arranged with outwardly projecting flanges at its side margins, arms supporting the ring and flanges on said hub, a supporting spindle adapted to receive the hub in various positions of rotatable adjustment, and means for holding the shoe against rotation on said spindle when in use.

7. In a sleet cutting trolley shoe, the combination of a hub, a ring provided with transverse slots and arranged with outwardly projecting flanges at its side margins, arms supporting the ring, and flanges on said hub, a supporting spindle adapted to receive the hub in various positions of rotatable adjustment, and means for holding the shoe against rotation on said spindle when in use, said ring being formed integrally with one of the outwardly projecting flanges, and the other of said flanges being formed integrally with said arms, together with a set of supporting ears connected with the ring and detachably secured to said arms whereby said ring, arms and flanges are rigidly connected.

8. In a sleet cutting trolley, a rotatably adjustable member provided with sleet cutters each adapted to be disposed for contact with a trolley wire in one position of rotatable adjustment, and means for normally holding said member against rotation.

In testimony whereof I affix my signature in the presence of two witnesses.

DELBERT E. BARTON.

Witnesses:
LEVERETT C. WHEELER,
I. D. BREMER.